United States Patent

Johnson

[11] Patent Number: 5,911,541
[45] Date of Patent: Jun. 15, 1999

[54] THIN LAYER SOLVENT EXTRACTION

[76] Inventor: Conrad B. Johnson, 10912-30 Street, Edmonton, Alberta, Canada, T5W 1V9

[21] Appl. No.: 08/971,037

[22] Filed: Nov. 14, 1997

[51] Int. Cl.$^6$ .............. B01D 11/02; B09C 1/00; B09C 1/04; E21B 43/16
[52] U.S. Cl. .............. 405/128; 134/7; 134/40; 166/306; 166/371; 208/434; 196/14.52; 209/173; 210/691; 210/693
[58] Field of Search ................... 166/305.1, 306, 166/369, 371; 134/6, 7, 25.1, 40, 42; 208/428, 434, 435; 209/173; 210/690, 691, 692, 693, 908, 909; 196/14.52; 405/128; 588/255

[56] References Cited

U.S. PATENT DOCUMENTS

| | | | |
|---|---|---|---|
| 2,487,805 | 11/1949 | Hermanson | 210/690 X |
| 3,399,765 | 9/1968 | Puddington et al. | |
| 3,464,920 | 9/1969 | Pirson et al. | 210/691 X |
| 3,518,183 | 6/1970 | Evans | 210/693 |
| 3,657,125 | 4/1972 | Strickman. | |
| 4,405,446 | 9/1983 | Kruyer | 210/693 X |
| 4,406,793 | 9/1983 | Kruyer | 210/669 |
| 5,242,598 | 9/1993 | Shannon et al. | 210/690 |
| 5,347,069 | 9/1994 | Sundar | 134/7 X |
| 5,417,864 | 5/1995 | Varadaraj | 405/128 X |
| 5,461,186 | 10/1995 | Lebowitz et al. | 405/128 X |
| 5,570,973 | 11/1996 | Hunt | 405/128 |
| 5,622,630 | 4/1997 | Romano | 210/691 |
| 5,769,777 | 6/1998 | Zinke | 210/691 X |

*Primary Examiner*—George Suchfield
*Attorney, Agent, or Firm*—Barnes & Thornburg

[57] ABSTRACT

A method for separating hydrocarbons from a soil, e.g. to separate bitumen from oil sands, involves mixing the soil thoroughly with water and a supply of buoyant beads having surfaces that are of oleophilic material and coated with a surface layer of hydrocarbon solvent. The beads, soil and water are agitated for a period during which hydrocarbons from the soil become adhered to the solvent coated beads. After the mixture has been allowed to settle the beads separate towards the top and are removed and treated with solvent to recover the adhered hydrocarbons therefrom. Suitable solvents are oil refinery products such as naphtha, kerosine, gasoline, varsol, toluene and diesel fuel.

17 Claims, 1 Drawing Sheet

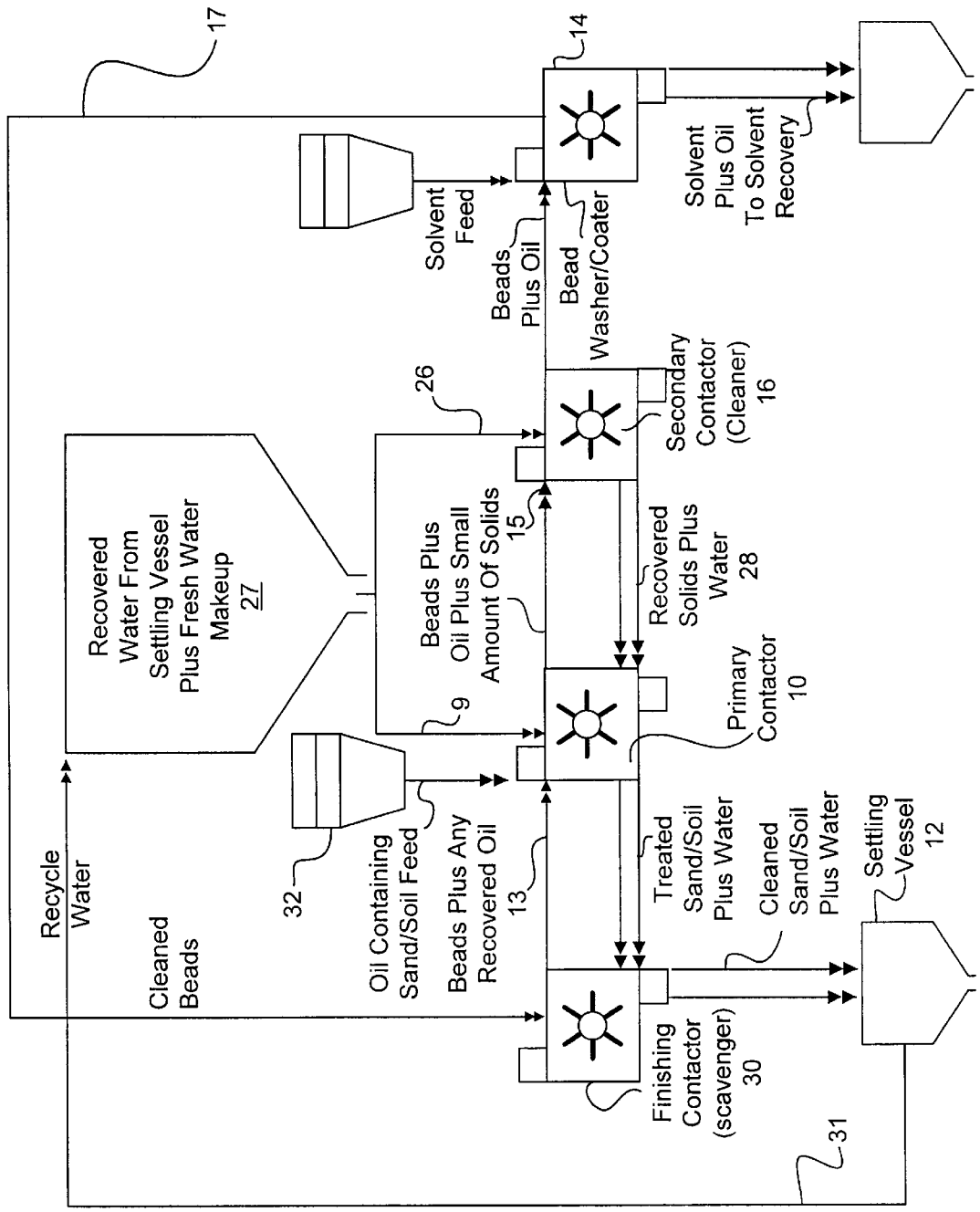

THIN LAYER SOLVENT EXTRACTION

BACKGROUND OF THE INVENTION

1. Field of the Invention

This invention relates to a new or improved method and system of apparatus for extracting hydrocarbons. The invention has particular application for recovering bituminous hydrocarbons from soils such as naturally occurring oil or tar sands as found in locations such as the Athabasca region of Alberta, Canada, and also for removing hydrocarbon contamination from soil, such contamination having been caused by a spill, leakage of fluids, or the like.

2. Description of the Prior Art

Numerous systems have been proposed in the prior art for separating hydrocarbon from soil, e.g. separating bitumen from mined oil sands. Canadian Patent 841,581 Paul H. Floyd et al. discloses a hot water treatment method in which a kind of froth-flotation separation cell is utilized to remove bitumen from the mixture.

U.S. Pat. No. 3,968,572 Stuchberry likewise discloses a system wherein bitumen is separated in a froth.

U.S. Pat. No. 4,406,793 Kruyer discloses a system employing free bodies having oleophilic and hydrophilic surfaces that are tumbled in a drum together with an emulsion or a slurry, the bodies causing particle size growth of the dispersed phase in the drum, the dispersed phase being captured by oleophilic surfaces e.g. on an endless conveyor belt and subsequently recovered.

SUMMARY OF THE INVENTION

The present invention provides a method for separating hydrocarbons from a soil comprising: (a) providing a supply of buoyant beads having surfaces that are of oleophilic material and coating said beads with a surface layer of a hydrocarbon solvent; (b) mixing said beads with said soil and with water and agitating said mixture causing hydrocarbons contained in said soil to adhere to said solvent coated beads; (c) allowing said agitated mixture to settle such that said beads with adhered hydrocarbons float to the top of said mixture; and (d) separating the beads from step (c) from said mixture and treating said beads with a solvent to recover the adhered hydrocarbons therefrom.

From another aspect the invention provides a system of apparatus for effecting separation of hydrocarbons from a soil in which said hydrocarbons are contained comprising: (i) a mixing vessel and means for delivery to said mixing vessel a quantity of said soil, water, and a quantity of lightweight beads that have surfaces of oleophilic material coated with a surface layer of a hydrocarbon solvent; (ii) means for agitating the contents of said vessel to ensure thorough mixing of said soil, said water, and said beads, and to cause adherence of said oleophilic material to said beads; (iii) means for removing said beads with adhered hydrocarbon thereon and delivering said beads to a solvent extractor; (iv) means in said solvent extractor for removing adhered hydrocarbon and hydrocarbon solvent from said beads; (v) means for delivering separated hydrocarbon and solvent from said solvent extractor; and (vi) means for separating said solvent from said hydrocarbon produced by said delivery means so that said solvent is available for recycling in said system.

The method is effective for extracting hydrocarbons of higher molecular weight (e.g. bitumen, crude oil, etc.) by the use of naturally buoyant oleophilic hydrophobic polymer beads. The solvent coating of the beads may be of a substance obtained from crude oil processing (e.g. kerosene, gasoline, diesel fuel, etc.).

The solvent coated beads are slurried with water and the soil containing the hydrocarbons, e.g. Athabasca Tar Sands, and are agitated to ensure thorough contact of the soil with the beads, the slurry mixture then being allowed to settle. The effect of this slurrying is to cause a certain amount of the hydrocarbon that was contained in the soil to adhere to the beads. Upon settling, the beads through their natural buoyancy float to the top of the mixture from where they are removed to recover the adhered hydrocarbon.

Repeated treatment of the soil by this process can result in a very high rate of recovery of the hydrocarbons. In the case of Athabasca Tar Sands, recovery rates of bitumen in excess of 98% have been achieved. Furthermore this has been done at ambient temperatures and without the use of auxiliary chemicals such as caustic soda (as is required in some prior art processes). In the absence of caustic soda the tailings i.e. the residual soil or sand, settle quickly so that the water can be recycled. Furthermore the solvent can also be recovered and reused.

The beads used are buoyant (i.e. they have a specific gravity that is below 1.0 preferably in the range 0.80 to 0.95, most preferably from 0.90 to 0.95) and are preferably of substances which are naturally hydrophobic and oleophilic, e.g. from the group of polymers known as polyolefins (polyethylene, polypropylene, polybutylene, etc.). From considerations of cost and availability, low density polyethylene is considered to be particularly suitable for use in the process.

The beads can be of any suitable composition that will provide the required buoyancy and adequate durability. For example they could comprise hollow bodies of e.g. ceramic or metal coated with a continuous layer of olephilic and hydrophobic material. However preferably the beads are of a homogeneous plastic polymer material as described in the preceding paragraph.

The beads used in the examples hereinafter set forth were of low density polyethylene and of roughly spherical shape with an average diameter of about 3.6 mm, there being approximately 44,000 beads per kilogram weight providing a total surface area of the order of 23,700 square centimeters per liter. The beads should not be too small since if they are they would not provide sufficient buoyancy to effect floatation when coated with adhered bitumen and any contained soil: the surface area to volume ratio would be too high. Above a certain size the surface area to volume ratio would be too low to provide efficient removal of bitumen, and excess size of the beads could hinder the mobility of the polymer/solvent/bitumen layer. Accordingly, it is preferred that the beads have a size in the range 3 to 8 mm and a specific gravity in the range 0.80 to 0.95.

The beads may be of various shapes, e.g. roughly spherical, short cylinders, and chips. While round or roughly spherical beads may be preferable, the shape of the beads is not critical, although shapes that would hinder the movability of the layer would be unacceptable.

Solvents which are lower in aromatics (kerosine, varsol and diesel fuel) are preferred since these have a tendency to soften the bitumen so that it can adhere more readily to the polymer. Higher boiling point solvents are preferable since with these evaporation loss in the process will be reduced.

The amount of solvent employed will vary depending upon the type, lower viscosity solvents such as gasoline and toluene being required in higher quantities whereas for higher viscosity solvents such as kerosine, varsol or diesel fuel, lower levels are required. The solvent content (i.e. the weight of solvent to the weight of the beads) typically will vary from about 2% for gasoline to about 10% for varsol.

As compared to prior art processes for hydrocarbon separation or recovery, the method of the present invention offers a number of advantages as follows:

(a) less solvent is required than would be the case in a conventional solvent extraction process, and a negligible amount of residual solvent remains in the soil after separation;

(b) the process does not require the application of heat, but rather can be carried out at normal atmospheric temperatures, and even temperatures as low as 0° C., thus avoiding the cost of heating the water and hydrocarbon source as had previously been required;

(c) after mixture and separation of the beads, the contained solids settle in the water in a matter of hours (rather than months or years as is the case with some existing processes);

(d) since the solids settle quickly the water can be recycled in the process rather than sent to a tailings pond for extended settling periods;

(e) the hydrocarbon depleted soils can be sufficiently cleansed or extracted that they are suitable for use in back fill operations and for re-vegetation; and (f) the method can provide hydrocarbon recoveries of the order of 98% or better, which exceeds existing processes without the need to add chemicals such as caustic soda which would create further downstream pollution problems.

BRIEF DESCRIPTION OF THE DRAWING

The invention will further be described, by way of example only, with reference to the accompanying drawing which shows a schematic diagram of a preferred embodiment of hydrocarbon recovery system in accordance with the invention.

DESCRIPTION OF THE PREFERRED EMBODIMENT

In the drawing, the base material which in the example herein disclosed is Athabasca oil sands, is mixed with water in a mixing vessel 10 comprising a primary contactor. In the vessel 10 the oil sands/water mixture is further mixed with solvent-coated beads delivered as indicated by line 13. In the example disclosed the beads are molding resin beads of polyethylene, being roughly of rounded shape, having a specific gravity of 0.90 to 0.94 and a surface area per liter of about 24,000 cm$^2$.

In the vessel 10 the mixture of oil sands, water and coated beads is thoroughly agitated for a duration of between 5 and 30 minutes. During this agitation it has been found that bitumen is extracted from the oil sand and becomes adhered to the coated beads. After agitation ceases the contents of the vessel 10 are allowed to settle, during this process the coated beads with adhered bitumen floating to the top, and sand and other heavier constituents sinking to the bottom and separated from the beads by water. The mechanism by which the solvent causes the bitumen to adhere to the beads is incompletely understood. While applicant does not wish to be bound by any specific theory, it is speculated that the solvent has the effect of softening the bitumen and reducing its viscosity, possibly causing individual droplets to agglomerate and adhere to the bead surface as a partly solubilized bitumen/solvent layer.

The coated beads with adhered bitumen are then removed and delivered as indicated by the arrow 15 to a secondary contacting vessel 16. In the vessel 16 the beads with adhered solvent and bitumen are agitated with water (supplied through a line 26 from a water tank 27) for a duration similar to the agitation that occurs in the primary contactor 10. After agitation the contents of the contactor 16 are allowed to settle, and the beads therefrom are advanced to a solvent extractor vessel 14, the recovered solids plus water being returned to the primary contactor via a line 28.

In the vessel 14 the beads are treated with a hydrocarbon solvent which removes the adhered bitumen (together with any contained soil solids) and the solvent layer from the beads. The solvent used to coat the beads is the same as the solvent used in the vessel 14 to remove the bitumen from the beads, that is to say the beads become coated with the solvent in the process of removing the bitumen therefrom.

From the vessel 14 the washed beads (which have a layer of solvent that may still contain minor amounts of dissolved oil/bitumen) are delivered via the line 17 to a finishing contactor or scavenger 30. The treated sand and water are delivered to the finishing contactor 30 from the primary contactor after completion of the agitation and settling step and removal of the beads to contactor 16. In the contactor 30 the fresh beads from line 17 are agitated with the water and sand from contactor 10 and act to remove remaining traces of oil/bitumen from the depleted sands. After agitating in the finishing scavenger 30 the residual soil and water is delivered to the settling vessel 12 from which recovered water is recirculated to the tank 27 through line 31.

The beads from the finishing contactor 30 are transferred to the primary contactor 10 where during agitation as described above they remove the majority of the oil/bitumen from the feedstock of sand delivered from a supply 32.

As shown in the diagram, the beads are moved successively from left to right from finishing scavenger 30, primary contactor 10, to the secondary contactor 16 and to the washing vessel 14. Water solids passing through the secondary contactor 16, primary contactor 10 and finishing contactor 30 are delivered to the settling vessel 12 and after separation by settling the water is recycled to the tank 27.

The cleaned sand and the like from the settling vessel 12 will have a very low content of oil/bitumen and solvent may be sent to a landfill site or the like.

The mixing vessel 10 in which the oil sand material is first mixed with water is supplied with water as indicated by the arrow 9. The water in tank 27 is water recovered from the settling vessel 12 together with make up quantities of fresh water.

All of the bitumen material is not removed from the oil sands in a single agitating cycle in the primary contacting vessel 10. Rather a series of agitating cycles are necessary in both the contactors 10 and 30. In this way, under suitable circumstances successive cycles have removed up to 98.8% of the bitumen of the bitumen contained in the oil sands, the resulting cleaned soil material comprising a free flowing tan coloured granular material with a very low bitumen content and virtually no solvent content.

With a single agitation cycle in the primary contacting vessel 10 it has been found possible to remove as much as 86% of the bitumen from the oil sands.

Recovery rates are dependent upon a number of factors as will be discussed more fully below:

(a) Base Material

This may comprise various forms of oil sands, shales, heavy oils, and various types of soil which may have been contaminated e.g. as a result of spillages of hydrocarbon.

(b) Solvent

The process can be operated with various solvents for extracting hydrocarbon material such as bitumen or crude oil from the base material. Preferred solvents are hydrocarbons which are available at relatively low costs from an oil refinery, examples being naphtha, kerosine, gasoline, varsol, and diesel fuel. For bitumen recovery it has been found that solvents which are lower in aromatics (kerosine, varsol, and diesel fuel) are preferable since they tend to soften the bitumen and cause it to adhere to the polymer. Higher boiling point solvents are preferable since with these less evaporation loss occurs in the process.

(c) Solvent Quantity

The optimum quantity of solvent used will depend upon the solvent type and also on the type of material being extracted. In practice the amount of solvent used has been determined by allowing the solvent coated beads to drain naturally in a perforated container for a period in the order of 15 minutes. In these circumstances it would be expected that the beads would retain more of the higher viscosity solvents. Thus, lower quantities are used where the solvent is of lower viscosity, e.g. gasoline or toluene, and higher quantities for higher viscosity solvents such as kerosine, varsol and diesel fuel. The ratio of solvent weight to the weight of the beads may vary from about 7% for gasoline to about 9% for varsol. Preferably the amount of solvent should be not more than about 5 to 10% by weight of the beads.

(d) Temperature

The optimum temperature for extraction can be determined by experimentation. For extraction of bitumen containing oil sands using varsol as a solvent evaluations were made by conducting agitation in the primary contacting vessel 10 at different temperatures. For a single agitation cycle the following results were obtained:

| Agitation Temperature Extracted | Percentage of Bitumen |
| --- | --- |
| 0° | 80.27 |
| 22° | 57.69 |
| 60° | 41.73 |

In a pilot plant system of apparatus for carrying out the invention applicant has used a No. 5 cell froth flotation machine designed by Hazen Research. This machine has four cells which can operate continuously or individually, each cell having a capacity of about 11 liters and being equipped with agitators that operate at speeds in the range 750–1300 rpm. About 500 grams of oil sands and various amounts of beads were added to the float cells together with approximately 8 liters of water and agitated for times ranging between 5 minutes and one hour. At the end of agitation the coated beads were scooped from the top of each cell and the remaining slurry discharged from the bottom of the cell.

In a commercial process it is envisaged that the function of the bead washer/coater 14 would be carried out by a washing machine in which the beads would first be washed in a solvent/bitumen mixture, and then sprayed with clean solvent and spun at high speeds to remove as much bitumen and solvent as possible. It is hoped that by this centrifuging action it might be possible to minimize the amount of solvent remaining on the beads. If there is too much solvent on the beads, then an oil/solvent layer forms on the water surface. The practical lower limit of solvent content on the beads would appear to be about 2% by weight, and for reasons as discussed above is preferred that the solvent content be less than 10% and most preferably less than 5% of the weight of the beads.

Although described in the foregoing solely in relation to the recovery of hydrocarbons from soils, it will be understood that other applications are envisaged for the invention. For example it is believed that the use of the solvent coated beads as described above would be effective for removing oil from oil polluted waters, when the beads are agitated with the oil/water mixture. Likewise the invention could be used for recovering hydrocarbons from oil coated stones and gravels.

By "soils" it is intended to include any types of naturally occurring soils sediments and granular material including but not restricted to sand and gravel.

The process described above is also useful in various specific cleaning operations where it is desired to remove bituminous material. One application that is thought to be suitable for the described process is in the cleaning of field tanks as used in oil fields. Crude oil produced from oil wells typically has sand and like materials entrained in it and therefore to remove such entrained material is typically passed through a large field tank which may include baffles and the like to encourage separation of the liquid oil. The co-produced sand contained in the crude oil eventually results in such field tanks becoming coated with a very thick layer of sand and oil which eventually reduces the volume of the tank to an unacceptable degree, upon which the tanks are typically steamed cleaned to remove the accumulated oil/sand layer, this removed material then being sent to a commercial disposal site at considerable expense. The process of the present invention is believed to be applicable to the cleaning of such tanks in situ by circulating the coated beads therethrough and successively removing and recycling the coated beads and removing the separated solids which after the coated bead treatment become relatively fluid, and suitable for disposal as non-hazardous solids.

Another application for the process of the invention is envisaged in the recovery of hydrocarbon material from in situ oil sands, heavy oil deposits, and depleted oil wells. In this arrangement solvent coated beads in a mixture with water would be pumped downwardly in a bore through overburden to the hydrocarbon containing formation and after mixing therein return to above ground surface through a separate conduit. The beads would then be treated to remove hydrocarbons which have become adhered to them in the formation being treated, and then recirculated. The mixture of solvent coated beads and water is injected into the hydrocarbon containing formation at a lower level, and extracted therefrom at a somewhat higher level to which the beads will be carried by their buoyancy, this movement of the beads through the formation providing the interaction which enables hydrocarbons from the formation to become adhered to the beads. Injection and removal of the beads can be done through a common well bore or through horizontally spaced well bores.

I claim:

1. A method for separating hydrocarbons from a soil comprising:
   (a) providing a supply of buoyant beads having surfaces that are of oleophilic material and coating said beads with a surface layer of a hydrocarbon solvent;
   (b) mixing said beads with said soil and with water and agitating said mixture causing hydrocarbons contained in said soil to adhere to said solvent coated beads;
   (c) allowing said agitated mixture to settle such that said beads with adhered hydrocarbons float to the top of said mixture; and (d) separating the beads from step (c) from said mixture and treating said beads with a solvent to recover the adhered hydrocarbons therefrom.

2. The method of claim 1 wherein said hydrocarbon solvent comprises at least one compound that is selected from the group of: naphtha, kerosine, gasoline, varsol, toluene, and diesel fuel.

3. The method as claimed in claim 1 wherein the solvent content by weight of said beads is between about 2% and about 10%.

4. The method of claimed in claim 3 wherein said solvent is gasoline or toluene and the solvent content of said mixture is between about 2% and 7% by weight of said beads.

5. The method as claimed in claim 3 wherein the solvent is kerosine, varsol or diesel fuel and is present in a concentration of between about 5% to 10% of the weight of the beads.

6. The method as claimed in claim 1 wherein the buoyant beads are of a naturally hydrophobic and oleophilic polymer.

7. The method as claimed in claim 6 wherein said polymer is a polyolefin.

8. The method as claimed in claim 7 wherein said polyolefin is low-density polyethylene.

9. The method of claim 6 wherein said beads have a specific gravity of about 0.90 to 0.95.

10. The method as claimed in claim 1 wherein said beads have an average width in the range 2 to 10 millimeters; a specific gravity in the range 0.80 to 0.95; and a surface area in the order of 24,000 square cm per liter.

11. The method as claimed in claim 10 wherein the width of said beads is in the range of about 3 to 8 centimeters, the specific gravity of said beads is in the range of about 0.80 to 0.95.

12. A system of apparatus for effecting separation of hydrocarbons from a soil in which said hydrocarbons are contained comprising:

(i) a mixing vessel and means for delivery to said mixing vessel a quantity of said soil, water, and a quantity of lightweight beads that have surfaces of oleophilic material coated with a surface layer of a hydrocarbon solvent;

(ii) means for agitating the contents of said vessel to ensure thorough mixing of said soil, said water, and said beads, and to cause adherence of hydrocarbons from said soil to said beads;

(iii) means for removing said beads with adhered hydrocarbon thereon and delivering said beads to a solvent extractor;

(iv) means in said solvent extractor for removing adhered hydrocarbon and hydrocarbon solvent from said beads;

(v) means for delivering separated hydrocarbon and solvent from said solvent extractor; and (vi) means for separating said solvent from said hydrocarbon produced by said delivery means so that said solvent is available for recycling in said system.

13. An apparatus system as claimed in claim 12 including a second mixing vessel is connected to receive beads with adhered hydrocarbon from said mixing vessel and to wash said beads with water.

14. An apparatus system as claimed in claim 12 including a finishing contactor vessel and means for delivering thereto the remaining contents in said mixing vessel after separation of the beads therefrom, said contactor vessel being adapted to receive a quantity of said lightweight beads coated with a surface layer of a hydrocarbon solvent, said finishing contactor being adapted to agitate said beads and said depleted soil and water; means being included to deliver the beads which have been agitated in said finishing contactor to said first vessel, and means being included to deliver the soil and water after agitation in said finishing contactor to a settling vessel.

15. A method for separating hydrocarbons from substances with which the hydrocarbons are in intimate contact comprising:

a) providing a supply of buoyant beads having surfaces that are of oleophilic material and coating said beads with a surface layer of a hydrocarbon solvent;

b) mixing said beads with said substances and water and agitating said mixture causing hydrocarbons contained in said substances to adhere to said solvent coated beads;

c) allowing said agitated mixture to settle such that said beads with adhered hydrocarbons float to the top of said mixture; and d) separating the beads from step c) from said mixture and treating said beads with a solvent to recover the adhered hydrocarbons therefrom.

16. The method of claim 1 applied to the cleaning of the interior of a tank which contains deposits of oil bearing soils, wherein step (b) is performed within said tank.

17. The method of claim 1 wherein the hydrocarbons to be separated are contained within a sub-surface formation that is covered by an overburden, and wherein said coated beads from step (a) are mixed with water and then injected into said sub-surface formation, step (b) taking place in said sub-surface formation, and wherein after step (c), said beads are brought to above-ground surface where step (d) is performed.

\* \* \* \* \*